United States Patent
Kim

(10) Patent No.: US 9,400,568 B2
(45) Date of Patent: Jul. 26, 2016

(54) METHOD FOR OPERATING IMAGE DISPLAY APPARATUS

(71) Applicant: LG ELECTRONICS INC., Seoul (KR)

(72) Inventor: Taeksoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 723 days.

(21) Appl. No.: 13/720,384

(22) Filed: Dec. 19, 2012

(65) Prior Publication Data

US 2013/0162533 A1    Jun. 27, 2013

(30) Foreign Application Priority Data

Dec. 22, 2011  (KR) .......................... 10-2011-0140154

(51) Int. Cl.
| | | |
|---|---|---|
| G06F 1/00 | (2006.01) | |
| G06F 3/033 | (2013.01) | |
| H04N 21/41 | (2011.01) | |
| H04N 21/443 | (2011.01) | |
| G06F 3/0484 | (2013.01) | |
| G06F 3/0481 | (2013.01) | |

(52) U.S. Cl.
CPC ............ *G06F 3/033* (2013.01); *G06F 3/04812* (2013.01); *G06F 3/04842* (2013.01); *H04N 21/4126* (2013.01); *H04N 21/4438* (2013.01)

(58) Field of Classification Search
CPC .................................. G06F 3/033; G09G 5/08
See application file for complete search history.

(56) References Cited

U.S. PATENT DOCUMENTS

| 5,808,601 A | 9/1998 | Leah et al. |
|---|---|---|
| 6,693,653 B1 | 2/2004 | Pauly |
| 2003/0227444 A1 | 12/2003 | Ootsuki |
| 2009/0122010 A1* | 5/2009 | Murai ........................... 345/158 |
| 2010/0001953 A1 | 1/2010 | Yamamoto et al. |
| 2011/0169734 A1* | 7/2011 | Cho ....................... G06F 3/0346 345/157 |
| 2011/0242038 A1* | 10/2011 | Kakuta et al. ................. 345/173 |

FOREIGN PATENT DOCUMENTS

WO    WO 98/21645 A1    5/1998

* cited by examiner

*Primary Examiner* — Michael Faragalla
(74) *Attorney, Agent, or Firm* — Birch, Stewart, Kolasch & Birch, LLP

(57) ABSTRACT

An image display apparatus and a method for operating the image display apparatus are disclosed. The method for operating an image display apparatus includes displaying at least one object on a display, displaying a pointer on the display, accumulating a movement value of a remote controller during a predetermined period, detecting reference coordinates of the displayed at least one object, correcting the accumulated movement value based on the reference coordinates if the reference coordinates are detected, and changing the location of the pointer based on the corrected value and displaying the pointer.

18 Claims, 11 Drawing Sheets

(a)    (b)

METHOD FOR OPERATING IMAGE DISPLAY APPARATUS

CROSS-REFERENCE TO RELATED APPLICATION

This application claims the priority benefit of Korean Patent Application No. 10-2011-0140154, filed on Dec. 22, 2011 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly to an image display apparatus and a method for operating the same, which are capable of increasing accuracy and efficiency of a remote controller so as to increase user convenience.

2. Description of the Related Art

An image display apparatus functions to display images to a user. A user can view a broadcast program using an image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which are capable of increasing accuracy and efficiency of a remote controller so as to increase user convenience.

In accordance with an aspect of the present invention, the above and other objects can be accomplished by the provision of a method for operating an image display apparatus, including displaying at least one object on a display, displaying a pointer on the display, accumulating a movement value of a remote controller during a predetermined period, detecting reference coordinates of the displayed at least one object, correcting the accumulated movement value based on the reference coordinates if the reference coordinates are detected, and changing the location of the pointer based on the corrected value and displaying the pointer.

In accordance with another aspect of the present invention, there is provided a method for operating an image display apparatus, including displaying a gravity button having a gravity point on a display, displaying a pointer on the display, receiving movement information of a remote controller, and changing the location of the pointer based on the received movement information and the gravity point and displaying the pointer on the display, wherein the gravity point is generated based on graphic coordinates of the gravity button.

According to the present invention, if an image display apparatus is controlled using a remote controller and, more particularly, a pointing device, accuracy and efficiency are improved so as to accurately perform operation desired by the user.

According to the present invention, it is possible to rapidly and accurately locate a pointer at a location desired by a user. Therefore, it is possible to increase user convenience.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

Figure 1:
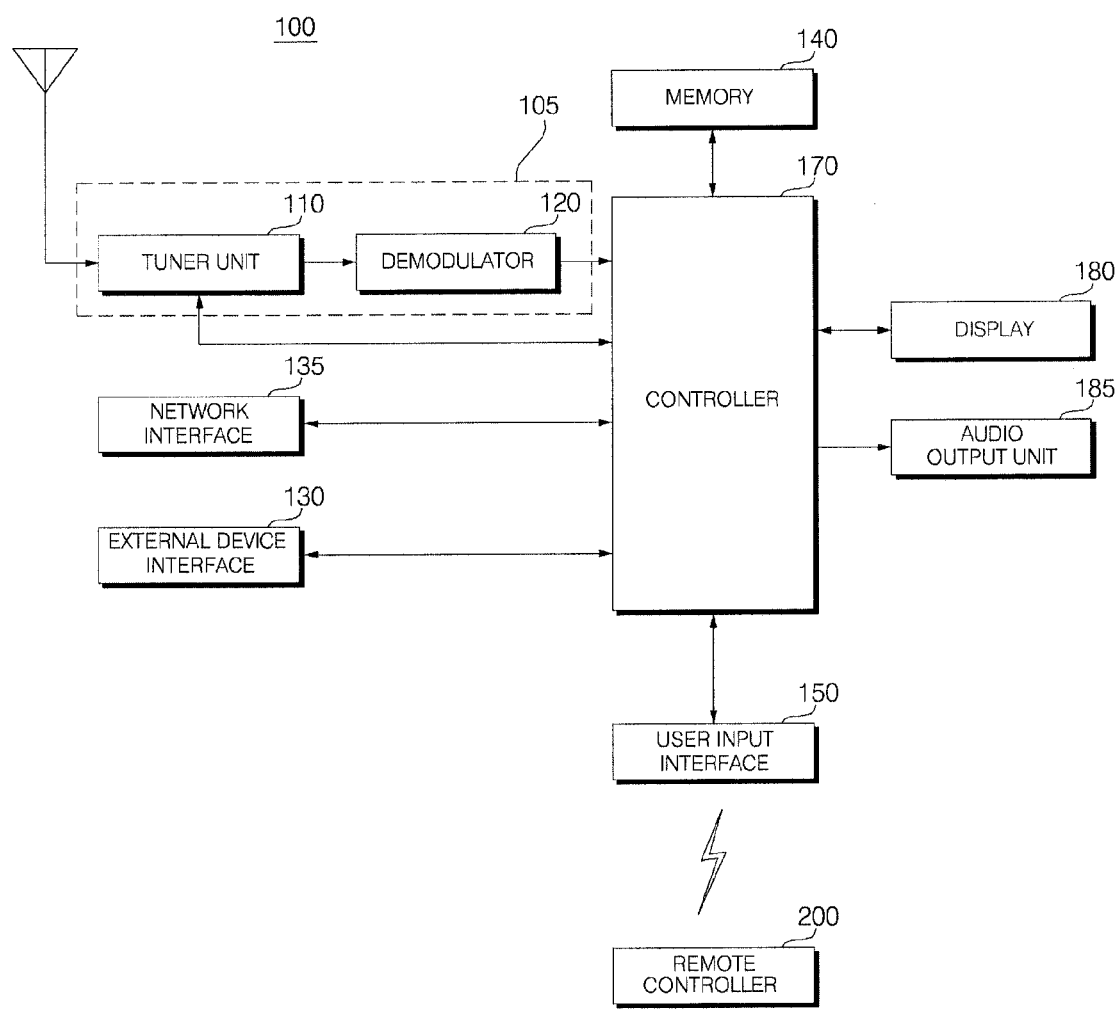
FIG. 1 is a block diagram showing the internal configuration of an image display apparatus according to an embodiment of the present invention.

The terms "module" and "unit" attached to describe the names of components are used herein to aid in understanding of the components and thus should not be considered as having specific meanings or roles. Accordingly, the terms "module" and "unit" may be used interchangeably. FIG. 1 is a block diagram showing the internal configuration of the image display apparatus according to an embodiment of the present invention.

Referring to FIG. 1, the image display apparatus 100 according to the embodiment of the present invention includes a broadcast reception unit 105, an external device interface 130, a memory 140, a user input interface 150, a sensor unit (not shown), a controller 170, a display 180 and an audio output unit 185.

The broadcast reception unit 105 may include a tuner unit 110, a demodulator 120 and a network interface 135. As needed, the broadcast reception unit 105 may include only the tuner unit 110 and the demodulator 120 or only the network interface 135.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal. That is, the tuner unit 110 may process a digital broadcast signal or an analog broadcast signal. The analog baseband AV signal (CVBS/SIF) output from the tuner unit 110 may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The tuner unit 110 may include a plurality of tuners in order to receive broadcast signals of a plurality of channels. Alternatively, the tuner unit may include a single tuner for simultaneously receiving broadcast signals of a plurality of channels.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve to transmit or receive data to or from an external device (not shown) connected thereto. For interfacing, the external device interface 130 may include an A/V Input/Output (I/O) unit (not shown) and/or a wireless communication module (not shown).

The external device interface 130 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit externally receives video and audio signals from the external device. The wireless communication unit may perform short-range wireless communication with another electronic apparatus.

The network interface 135 serves as an interface between the image display apparatus 100 and a wired/wireless network such as the Internet. The network interface 135 may receive content or data provided by an Internet or content provider or a network operator over a network.

The network interface 135 performs data communication with an electronic apparatus located near the image display apparatus 100. At this time, the network interface 135 may receive apparatus information of another electronic apparatus or remote controllable channel information, frequency information or code information of another electronic apparatus.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function of a channel map.

In addition, the memory 140 may store infrared (IR) format key codes for controlling other electronic apparatuses as IR signals and store an IR format key database of a plurality of electronic apparatuses.

The memory 140 may include data for graphic processing. For example, the memory 140 may store graphic data of an object such as an OSD, a gravity point table, etc.

The memory 140 may include one or more memory elements. In addition, the memory 140 may include a buffer for temporarily storing and processing data.

While the memory 140 is shown in FIG. 1 as being configured separately from the controller 170, to which the present invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys (not shown), such as inputs of a power key, a channel key, and a volume key, and setting values, or provide the controller 170 with a user input signal received from a sensor unit (not shown) for sensing a user gesture, or transmit a signal received from the controller 170 to a sensor unit (not shown).

According to an embodiment of the present invention, the user input interface 150 may receive personal information from the remote controller 200. The user input interface 150 may further receive information about a web server accessed using the personal information in addition to the personal information.

For example, if a mobile terminal 300 and the remote controller 200 are within a predetermined distance of each other to perform a near field communication (NFC), the remote controller 200 may receive the personal information stored in the mobile terminal 300. The remote controller 200 may transmit the personal information to the image display apparatus 100 according to an IR method or an radio frequency (RF) method. At this time, the user input interface 150 sends the received personal information to the controller 170.

The personal information may include personal ID information, password information, personal email information, etc. of the mobile terminal 300. Alternatively, the personal information may include personal ID information, password information, personal email information, etc. of the image display apparatus 100. Alternatively, the personal information may include personal ID information, password information, etc. of various electronic apparatus, which may be commonly used, including the mobile terminal 300. Alternatively, the personal information may include personal ID information, password information, etc. of a predetermined web server previously stored in the mobile terminal 300. Alternatively, the personal information may include personal ID information, password information, etc. of a predetermined server web which may be used in the mobile terminal 300, the image display apparatus 100, etc. Alternatively, the personal information may include personal ID information, password information, etc. of a server connected to the image display apparatus 100.

That is, the personal information may be necessary to log in to an electronic apparatus or service.

The user input interface 150 may receive apparatus information of another electronic apparatus or remote controllable channel information, frequency information or code information of another electronic apparatus from an electronic apparatus located near the image display apparatus 100 through the remote controller 200.

The controller 170 may demultiplex the stream signal received from the tuner unit 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 1, the controller 170 may include a DEMUX, a video processor, etc., which will be described in detail later with reference to FIG. 2.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program.

The controller 170 may control the display 180 to display images. The image displayed on the display 180 may be a Two-Dimensional (2D) or Three-Dimensional (3D) still or moving image.

The controller 170 may generate and display a predetermined object of an image displayed on the display 180 as a 3D object. For example, the object may be at least one of a screen of an accessed website (newspaper, magazine, etc.), an electronic program guide (EPG), various menus, a widget, an icon, a still image, a moving image, text, etc.

The controller 170 recognizes the position of the user based on an image captured by a camera unit (not shown). For example, a distance (z-axis coordinate) between the user and the image display apparatus 100 may be detected. An x-axis coordinate and a y-axis coordinate in the image display apparatus 100 corresponding to the position of the user may be detected.

According to an embodiment of the present invention, the controller 170 may control login based on the personal information received from the remote controller 200. At this time, login may be login of the image display apparatus 100, login of a server connected to the image display apparatus 100, or login of a predetermined web server to which a user subscribes using personal information thereof.

For example, if the user logs in to the image display apparatus 100 using personal ID information and password information received from the remote controller 200, the controller 170 may control the display 180 to display a personal screen of the user set according to a user account. If there is an image which is being viewed, the controller 170 may control the display 180 to display a personal setting screen along with the image which is being viewed. Alternatively, the controller 170 may switch the image which is being viewed to a personal setting screen.

As another example, if the user logs in to the server connected to the image display apparatus 100, the controller 170 may control the display 180 to display a server access screen received from the server. More specifically, the screen may be an app server screen. If there is an image which is being viewed, the controller 170 may control the display 180 to display a server access screen along with the image which is being viewed. Alternatively, the controller 170 may switch the image which is being viewed to a server access screen.

As another example, if the received personal information is personal information of another electronic apparatus and, more particularly, a predetermined web server accessed by the mobile terminal 300, the controller 170 may control the image display apparatus 100 to access the web server and control the display 180 to display a screen of the accessed web server. This web server may provide a social network service. If there is an image which is being viewed, the controller 170 may control the display 180 to display the screen of the accessed web server along with the image which is being viewed. Alternatively, the controller 170 may switch the image which is being viewed to the screen of the accessed web server.

The controller 170 may control a power supply (not shown) for supplying power to the image display apparatus 100 if the image display apparatus 100 is in an off state when the personal information is received. That is, if the user input interface 150 receives the personal information in a standby mode, the controller 170 may switch the standby mode to a wakeup mode and control the power supply to supply power to various modules or units.

The controller 170 may determine whether each electronic apparatus is connected according to the personal information from the remote controller 200 based on apparatus information of another electronic apparatus located near the image display apparatus 100 or remote controllable channel information, frequency information or code information of another electronic apparatus, which is received from the network interface 135 or the user input interface 150, and control the display 180 to display an object indicating that another electronic apparatus has been logged in.

Alternatively, the controller 170 may control transmission of apparatus information, channel information, frequency information and code information to the remote controller 200, based on apparatus information of another electronic apparatus located near the image display apparatus 100 or remote controllable channel information, frequency information or code information of another electronic apparatus.

Although not shown, a channel browsing processor for generating a thumbnail image corresponding to a channel signal or an external input signal may be further included. The channel browsing processor may receive the stream signal TS output from the demodulator 120 or the stream signal output from the external device interface 130, extract an image from the received stream signal, and generate a thumbnail image. The generated thumbnail image may be decoded into a stream form to be input to the controller 170 together with the decoded image. The controller 170 may display a thumbnail list including a plurality of thumbnail images on the display 180 using the input thumbnail image.

The thumbnail list may be displayed in a brief viewing method of displaying the thumbnail list in a part of an area in a state of displaying a predetermined image or may be displayed in a full viewing method of displaying the thumbnail list in a full area. The thumbnail images in the thumbnail list may be sequentially updated.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. In particular, the display 180 may be a 3D display.

If the display 180 is a touchscreen, the display 180 may function as not only an output device but also as an input device.

The audio output unit 185 receives the audio signal processed by the controller 170 and outputs the received audio signal as sound.

The camera unit (not shown) captures images of a user. The camera unit (not shown) may be implemented by one camera, but the present invention is not limited thereto. That is, the camera unit may be implemented by a plurality of cameras. The camera unit (not shown) may be embedded in the image display apparatus 100 at the upper side of the display 180 or may be separately provided. Image information captured by the camera unit (not shown) may be input to the controller 170.

The controller 170 may sense a user gesture from an image captured by the camera unit (not shown), a signal sensed by the sensor unit (not shown), or a combination of the captured image and the sensed signal.

The remote controller 200 transmits user input to the user input interface 150. For transmission of user input, the remote controller 200 may use various communication techniques such as Bluetooth, RF communication, IR communication, Ultra Wideband (UWB), ZigBee and near field communication (NFC).

In addition, the remote controller 200 may receive a video signal, an audio signal or a data signal from the user input interface 15. The remote controller 200 output the received signals visually or audibly based on the received video, audio or data signal.

The remote controller 200 according to the embodiment of the present invention may receive information by near field communication with a predetermined electronic apparatus. The information may include personal ID information and password information which may be used in the mobile terminal, the image display apparatus or the electronic apparatus, as described above.

The remote controller 200 may transmit the received personal information to the image display apparatus 100. As this time, an IR method or an RF method may be used as the communication method.

In the embodiment of the present invention, it is assumed that the remote controller 200 is a pointing device for displaying a pointer corresponding to user motion. That is, the remote controller 200 may transmit personal information to the image display apparatus 100 using an RF method.

The remote controller 200 may further receive information about a web server accessed using the personal information in addition to the personal information. For example, the remote controller 200 may receive web server information of a social network service which is being logged in to and accessed by the mobile terminal. Such web server information is also transmitted to the image display apparatus 100.

The remote controller 200 may receive apparatus information of another electronic apparatus or remote controllable channel information, frequency information or code information of another electronic apparatus from an electronic apparatus located near the image display apparatus 100. Based on the information about another electronic apparatus, a channel, frequency or code may be allocated to the electronic apparatus so as to perform remote control.

The above-described image display apparatus 100 may be a fixed or mobile digital broadcast receiver capable of receiving a digital broadcast.

The block diagram of the image display apparatus 100 illustrated in FIG. 1 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike FIG. 1, the image display apparatus 100 may not include the tuner unit 110 and the demodulator 120 shown in FIG. 1 and may receive broadcast content via the network interface 135 or the external device interface 135 and play the broadcast content back.

Figure 2:
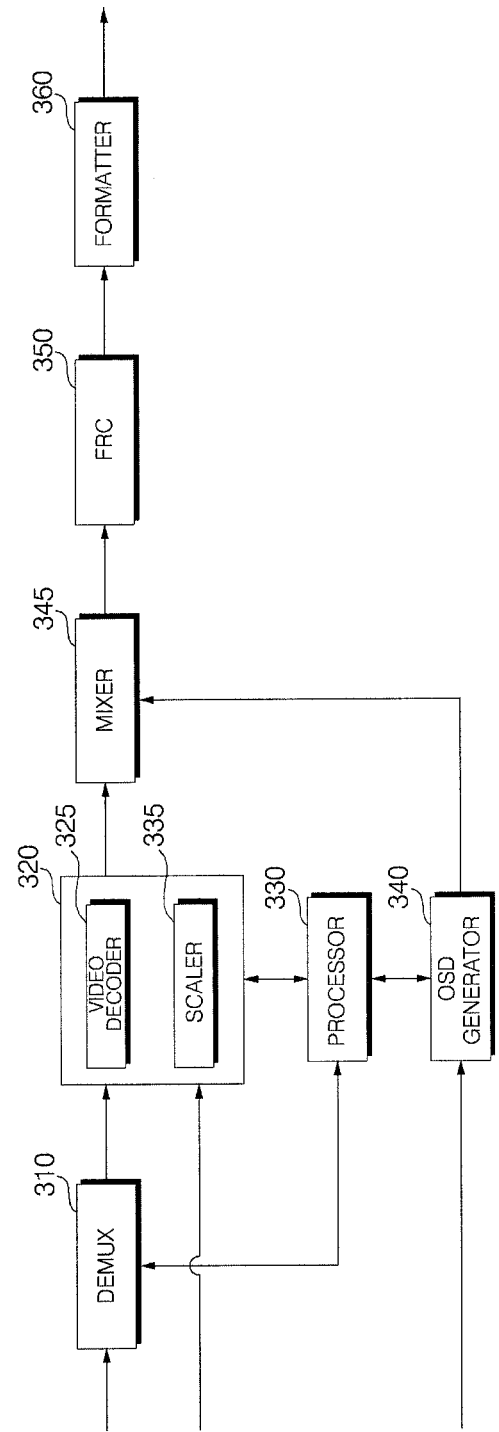
FIG. 2 is a block diagram showing the internal configuration of a controller of FIG. 1.

FIG. 2 is a block diagram showing the internal configuration of the controller illustrated in FIG. 1.

Referring to FIG. 2, the controller 170 according to the embodiment of the present invention may include a DEMUX 310, a video processor 320, a processor 330, an OSD generator 340, a mixer 345, a Frame Rate Converter (FRC) 350, and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 11Q, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control overall operation of the image display apparatus 100 or the controller 170. For example, the processor 330 may control the tuner unit 110 to tune to an RF broadcast corresponding to an RF signal corresponding to a channel selected by the user or a previously stored channel.

The processor 330 may control the image display apparatus 100 by a user command input through the user input interface 150 or an internal program.

The processor 330 may control data transmission of the network interface 135 or the external device interface 130.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

The OSD generator 340 may generate a pointer which can be displayed on the display according to a pointing signal received from the remote controller 200. In particular, such a pointer may be generated by a pointing signal processor and the OSD generator 340 may include such a pointing signal processor (not shown). Alternatively, the pointing signal processor (not shown) may be provided separately from the OSD generator 340.

In association with the embodiment of the present invention, the OSD generator 340 may generate or configure a set personal screen if the user logs in to the image display apparatus 100. Alternatively, the OSD generator 340 may generate or configure at least a part of a server access screen so as to display a server access screen received from a server on the display 180 if the user logs in to the accessed server. Alternatively, the OSD generator 340 may generate or configure at least a part of a web server access screen based on information about a web server which is being accessed using personal information.

The mixer 345 may mix the decoded video signal processed by the video processor 320 with the OSD signal generated by the OSD generator 340. Each of the OSD signal and the decoded video signal may include at least one of a 2D signal and a 3D signal. The mixed video signal is provided to the FRC 350.

The FRC 350 may change the frame rate of an input image. The FRC 350 may maintain the frame rate of the input image without frame rate conversion.

The formatter 360 changes the format of the signal mixed by the mixer 345, that is, the OSD signal and decoded video signal, to be suitable for the display 180. For example, the formatter 360 may convert a received signal into an RGB data signal. The RGB signal may be output in the form of a Low Voltage Differential Signal (LVDS) or mini-LVDS.

The formatter 360 may separate a 2D video signal and a 3D video signal, for 3D video display. The formatter 360 may change the format of a 3D video signal or convert a 2D video signal into a 3D video signal.

The audio processor (not shown) of the controller 170 may process the demultiplexed audio signal. For audio signal processing, the audio processor may have various decoders.

The audio processor (not shown) of the controller 170 may also adjust the bass, treble or volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

Although the formatter 360 performs 3D processing after the signals from the OSD generator 340 and the video processor 320 are mixed by the mixer 345 in FIG. 2, the present invention is not limited thereto and the mixer may be located at a next stage of the formatter.

The block diagram of the controller 170 shown in FIG. 2 is exemplary. The components of the block diagrams may be integrated or omitted, or a new component may be added according to the specifications of the controller 170.

In particular, the FRC 350 and the formatter 360 may be included separately from the controller 170.

Figure 3:
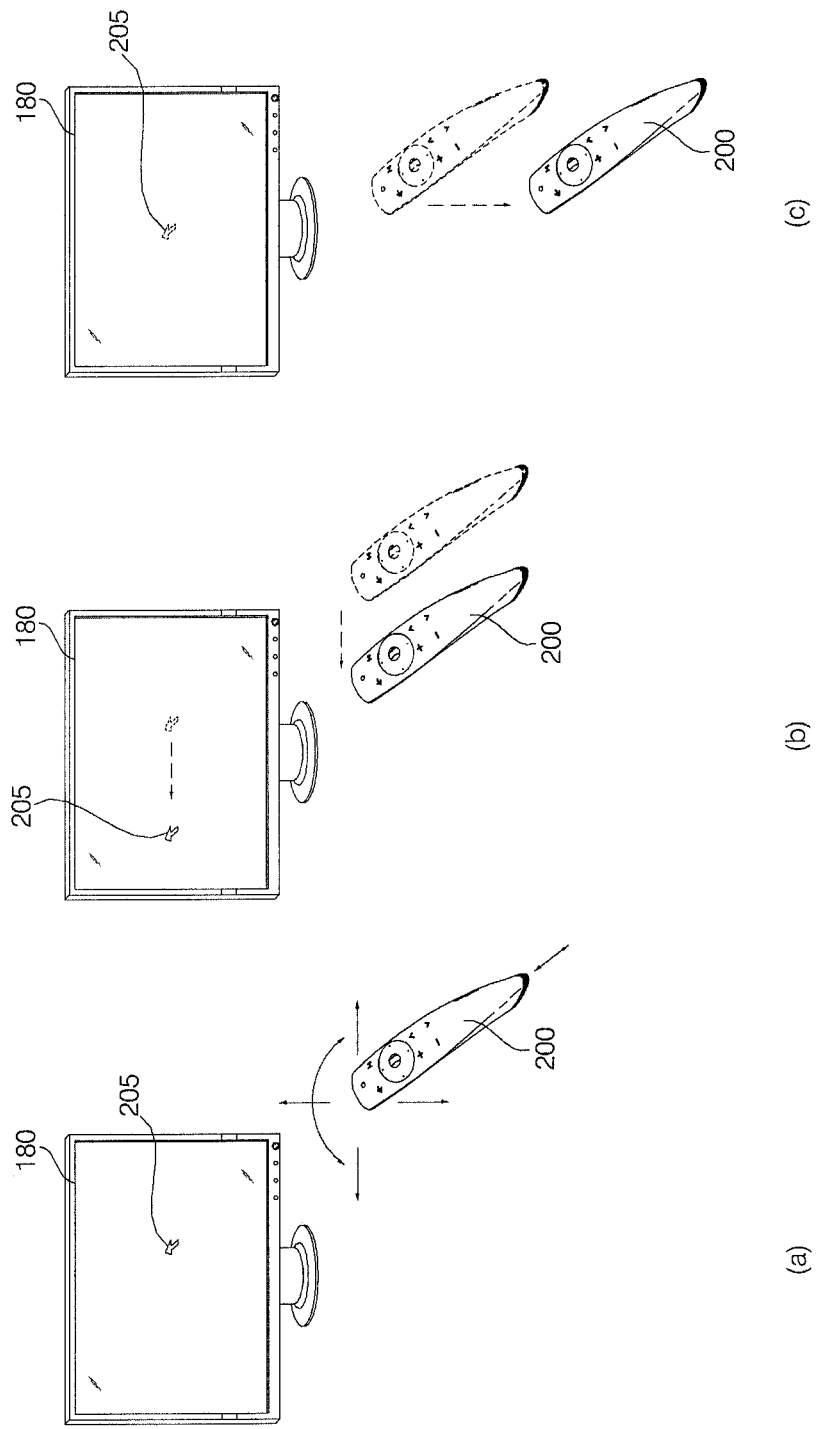
FIG. 3 is a diagram showing a method of controlling a remote controller of FIG. 1.

FIG. 3 is a diagram showing a method of controlling a remote controller of FIG. 1.

FIG. 3(a) illustrates a pointer 205 representing movement of the remote controller 200 displayed on the display 180.

The user may move or rotate the remote controller 200 up and down, side to side (FIG. 3(b)), and back and forth (FIG. 3(c)). The pointer 205 displayed on the display 180 of the image display apparatus corresponds to the movement of the remote controller 200. Since the pointer 205 moves in accordance with the movement of the remote controller 200 in a 3D space, the remote controller 200 may be referred to as a pointing device.

Referring to FIG. 3(b), if the user moves the remote controller 200 to the left, the pointer 205 moves to the left on the display 180 of the image display apparatus.

Information about the movement of the remote controller 200 sensed by the sensor of the remote controller 200 is transmitted to the image display apparatus. The image display apparatus may calculate the coordinates of the pointer 205 from the information about the movement of the remote controller 200. Then, the image display apparatus may display the pointer 205 at the calculated coordinates.

Referring to FIG. 3(c), while pressing a predetermined button of the remote controller 200, the user moves the remote controller 200 away from the display 180. Then, a selection area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. Alternatively, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4:
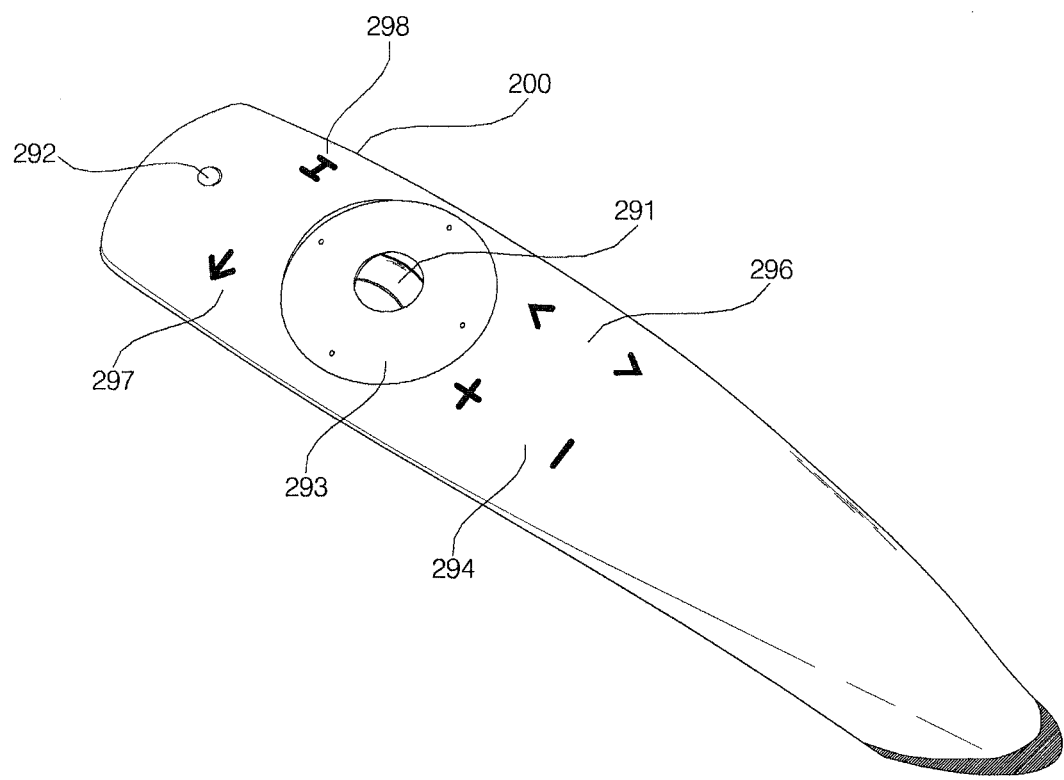
FIG. 4 is a perspective view of a remote controller according to an embodiment of the present invention.
Figure 5:
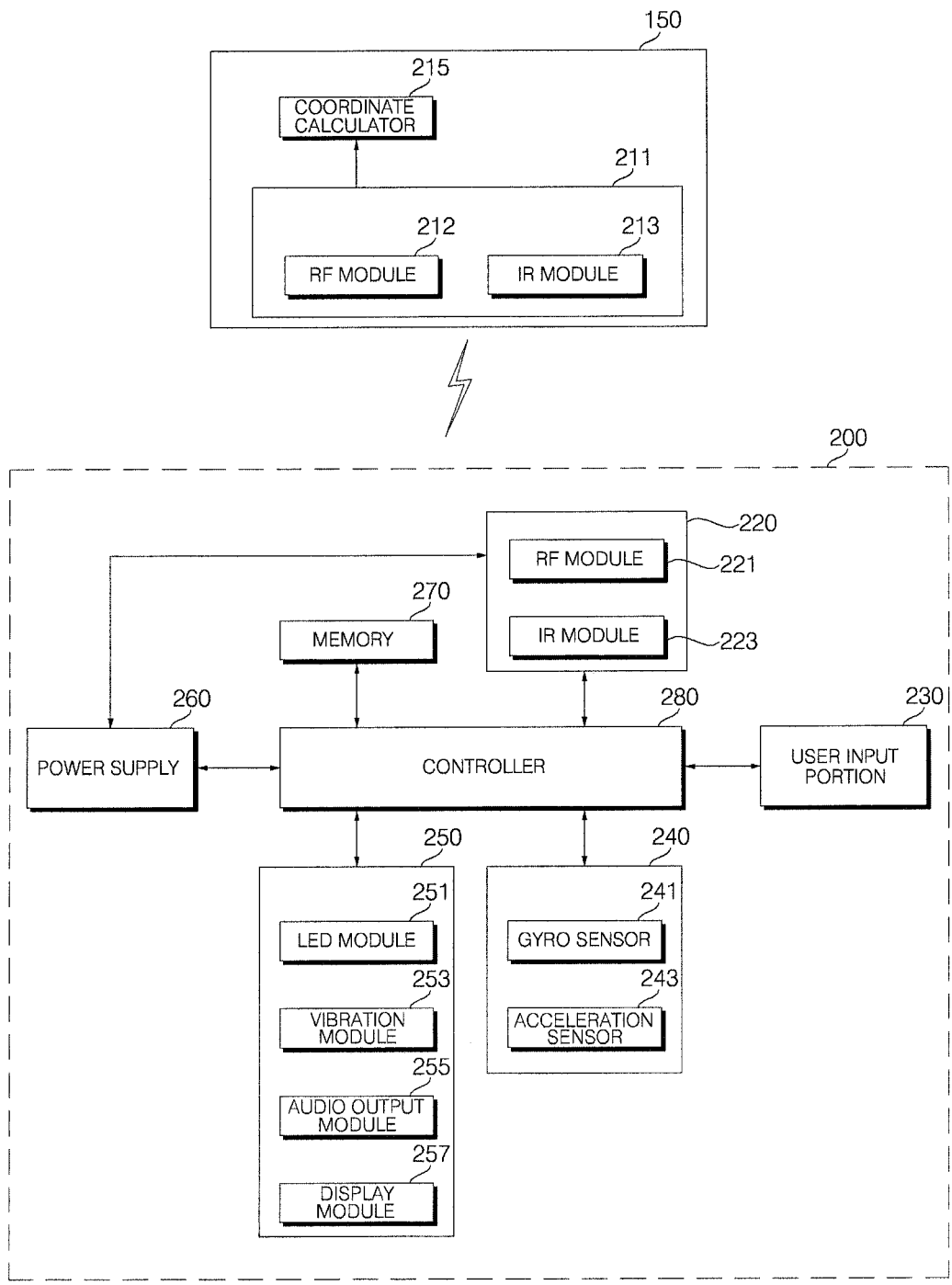
FIG. 5 is a block diagram showing the internal configuration of a remote controller according to an embodiment of the present invention.

FIG. 4 is a perspective view of a remote controller according to an embodiment of the present invention and FIG. 5 is a block diagram showing the internal configuration of a remote controller according to an embodiment of the present invention.

Referring to FIG. 4, the pointing device 201 according to the embodiment of the present invention may include various input keys, input buttons, etc.

For example, the pointing device 201 may include an okay key 291, a menu key 292, a 4-direction key 293, a channel control key 294, and a volume control key 296.

For example, the okay key 291 may be used to select a menu or item, the menu key 292 may be used to display a predetermined menu, the 4-direction key 294 may be used to move a pointer or indicator up, down, left and right, the channel control key 294 may be used to move a channel up or down, and the volume control key 296 may be used for volume control.

The pointing device 201 may further include a back key 297 and a home key 298. For example, the back key 297 may be used to move a screen to a previous screen and the home key 298 may be used to move a screen to a home screen.

As shown in FIG. 4, the okay key 291 may further include a scroll function. For the scroll function, the okay key 291 may be implemented as a wheel key. That is, if the okay key 291 is pushed, the okay key 291 is used to select a menu or item and, if the okay key 291 is scrolled up or down, the okay key 291 is used to scroll a display screen or switch a list page.

More specifically, when the okay key 291 is scrolled for image searching in a state in which an image having a size greater than the size of the display is displayed on the display 180, an image region which is not currently displayed is displayed on the display. As another example, if the okay key 291 is scrolled in a state in which a list page is displayed on the display 180, a previous page or a next page of a current page may be displayed.

Such a scroll function may be included separately from the okay key 291.

The four-direction key 293 may include up, down, left and right keys in a circular shape as shown in FIG. 4. Touch input using the four-direction key 293 may be possible. For example, if a touch operation from the up key to the down key in the four-direction key 293 is performed, a set function may be input or performed according to the touch input.

Referring to FIG. 5, the remote controller 200 may include a radio transceiver 220, a user input portion 230, a sensor portion 240, an output portion 250, a power supply 260, a memory 270, and a controller 280.

The radio transceiver 220 transmits and receives signals to and from any one of the image display devices according to the embodiments of the present invention. Among the image display apparatuses according to the embodiments of the present invention, for example, one image display apparatus 100 will be described.

In accordance with the exemplary embodiment of the present invention, the remote controller 200 may be provided with an RF module 221 for transmitting and receiving signals to and from the image display device 100 according to an RF communication standard. Also, the remote controller 200 may include an IR module 223 for transmitting and receiving signals to and from the image display device 100 according to an IR communication standard.

In addition, the remote controller 200 may further include an NFC module (not shown) for NFC with an electronic apparatus.

The remote controller 200 may transmit information about movement of the remote controller 200 to the image display apparatus 100 via the RF module 221.

The remote controller 200 may receive the signal from the image display apparatus 100 via the RF module 221. The remote controller 200 may transmit commands associated with power on/off, channel switching, volume change, etc. to the image display device 100 through the IR module 223.

According to the present embodiment, the remote controller 200 may receive personal information by NFC with a predetermined electronic apparatus.

The remote controller 200 may transmit the received personal information to the image display apparatus 100. At this time, an IR method or an RF method may be used as a communication method.

The remote controller 200 may further receive information about a web server which is being accessed using the personal information, in addition to the personal information. For example, the remote controller 200 may receive web server information of a social network service which is being logged in and accessed by the mobile terminal 300. Such web server information may also be transmitted to the image display apparatus 100.

The remote controller 200 may receive apparatus information of another electronic apparatus or remote controllable channel information, frequency information or code information of another electronic apparatus. Based on the information about another electronic apparatus, a channel, frequency or code may be allocated to the electronic apparatus so as to perform remote control.

The user input portion 230 may include a keypad, a key (button), a touch pad or a touchscreen. The user may enter a command related to the image display device 100 to the remote controller 200 by manipulating the user input portion 230. If the user input portion 230 includes hard keys, the user may enter commands related to the image display device 100 to the remote controller 200 by pushing the hard keys. If the user input portion 230 is provided with a touchscreen, the user may enter commands related to the image display device 100 to the remote controller 200 by touching soft keys on the touchscreen. Also, the user input portion 230 may have a variety of input means which may be manipulated by the user, such as a scroll key, a jog key, etc., to which the present invention is not limited.

The sensor portion 240 may include a gyroscopic sensor 241 or an acceleration sensor 243. The gyroscopic sensor 241 may sense information about movement of the remote controller 200.

For example, the gyroscopic sensor 241 may sense information about movement of the remote controller 200 along x, y and z axes. The acceleration sensor 243 may sense information about the velocity of the remote controller 200. The sensor portion 240 may further include a distance measurement sensor for sensing a distance from the display 180. Alternatively, the sensor portion 240 may include a geomagnetic sensor for detecting flow of a magnetic field generated by earth and detecting a compass bearing to detect change in the compass bearing.

The output portion 250 may output a video or audio signal corresponding to manipulation of the user input portion 230 or a signal transmitted by the image display device 100. The user may be aware from the output portion 250 whether the user input portion 230 has been manipulated or the image display device 100 has been controlled.

For example, the output portion 250 may include a Light Emitting Diode (LED) module 251 for illuminating when the user input portion 230 has been manipulated or a signal is transmitted to or received from the image display device 100 through the radio transceiver 220, a vibration module 253 for generating vibrations, an audio output module 255 for outputting audio, or a display module 257 for outputting video.

The power supply 260 supplies power to the remote controller 200. When the remote controller 200 is kept stationary for a predetermined time, the power supply 260 blocks power from the remote controller 200, thereby preventing waste of power. When a predetermined key of the remote controller 200 is manipulated, the power supply 260 may resume power supply.

The memory 270 may store a plurality of types of programs required for control or operation of the remote controller 200, or application data. When the remote controller 200 transmits and receives signals to and from the image display device 100 wirelessly through the RF module 221, the remote controller 200 and the image display device 100 perform signal transmission and reception in a predetermined frequency band. The controller 280 of the remote controller 200 may store information about the frequency band in which to wirelessly transmit and receive signals to and from the image display device 100 paired with the remote controller 200 in the memory 270 and refer to the information.

The memory 270 may store IR format key codes for controlling other electronic apparatuses as IR signals and store an IR format key database of a plurality of electronic apparatuses.

The controller 280 provides overall control to the remote controller 200. The controller 280 may transmit a signal corresponding to predetermined key manipulation on the user input portion 230 or a signal corresponding to an movement of the remote controller 200 sensed by the sensor portion 240 to the image display device 100 through the radio transceiver 220.

The controller 280 may control transmission of the received personal information to the image display apparatus 100 through the radio transceiver 220 by NFC with an electronic apparatus. In particular, if predetermined key input of the user input portion 230 is performed, the controller 280 may control transmission of the received personal information to the image display apparatus 100 through the radio transceiver 220.

In addition, the controller 280 may control transmission of the received personal information to an electronic apparatus other than the image display apparatus 100. At this time, different channels, frequencies or codes may be used with respect to electronic apparatuses. Such channels, frequencies or codes may be based on apparatus information or remote controllable channel information, frequency information or code information previously received from another electronic apparatus.

The user input interface 150 of the image display device 100 may have a radio transceiver 211 for wirelessly transmitting and receiving signals to and from the remote controller 200, and a coordinate calculator 215 for calculating the coordinates of the pointer corresponding to an operation of the remote controller 200.

The user input interface 150 may transmit and receive signals wirelessly to and from the remote controller 200 through an RF module 212. The user input interface 150 may also receive a signal from the remote controller 200 through an IR module 213 based on the IR communication standard.

The coordinate calculator 215 may calculate the coordinates (x, y) of the pointer to be displayed on the display 180 by correcting handshaking or errors from a signal corresponding to an operation of the remote controller 200 received through the radio transceiver 211.

A signal transmitted from the remote controller 200 to the image display apparatus 100 through the user input interface 150 is provided to the controller 180 of the image display device 100. The controller 180 may identify information about an operation of the remote controller 200 or key manipulation on the remote controller 200 from the signal received from the remote controller 200 and control the image display device 100 according to the information.

In another example, the remote controller 200 may calculate the coordinates of the pointer corresponding to the operation of the remote controller and output the coordinates to the user input interface 150 of the image display device 100. The user input interface 150 of the image display device 100 may then transmit information about the received coordinates to the controller 180 without correcting handshaking or errors.

As another example, the coordinate calculator 215 may not be included in the user input interface 150 but may be included in the controller 170.

Figure 6:
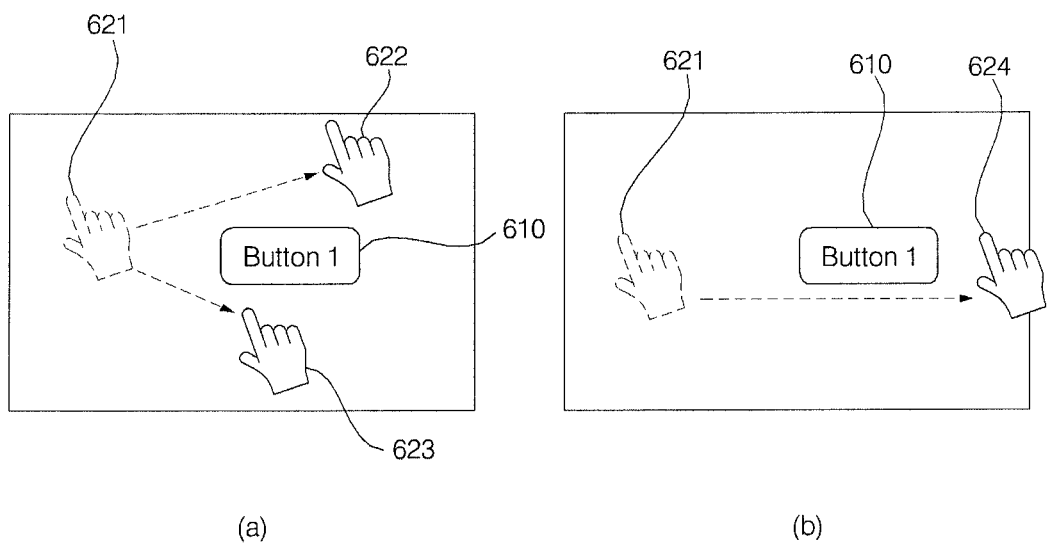
FIG. 6 is a diagram showing an example of operation of an image display apparatus.

FIG. 6 is a diagram showing an example of operation of an image display apparatus.

As smart TVs having various functions have come into widespread use, there is a need for convenient to operate a pointing device.

An image display apparatus has three features such as a large screen, a passive viewer and a graphical user interface (GUI) simpler than that of a personal computer (PC), as compared to other electronic apparatuses. Accordingly, a touch, mouse or optical trackpad (OTP) method applied to the existing PC or phone may not be applied to the image display apparatus without change and needs to be improved according to TV features.

However, if a direction is controlled using a pointing device or an OTP, direction errors or strength errors may frequently occur as shown in FIG. 6.

FIG. 6(a) shows direction errors. Although a user wishes to move a pointer 621 using a remote controller to select a button 1 610, the pointer may be moved to a pointer 622 or 623 deviated from the button 1 upward or downward.

FIG. 6(b) shows strength errors. Although a user wishes to move a pointer 621 using a remote controller to select a button 1 610, the pointer may pass the button 1 610 and move to a pointer 624.

That is, since the user does not accurately know in which direction the pointer is moved or a distance by which the pointer is moved according to movement direction or distance of the remote controller, the user may not move the pointer to a desired location.

Then, the user does not locate the pointer at various controllers such as buttons and must repeatedly correct the location of the pointer to operate buttons. Therefore, user satisfaction is reduced and thus the user may no longer use the pointing device.

Accordingly, the present invention provides an image display apparatus, which is capable of being conveniently controlled by a user by adding a gravity function for correcting display coordinates of a pointer in a remote controller such as a pointing device, and a method for controlling the same.

The remote controller may include a mouse using a pointer, an optical trackpad (OTP), etc. in addition to the pointing device.

Figure 7:
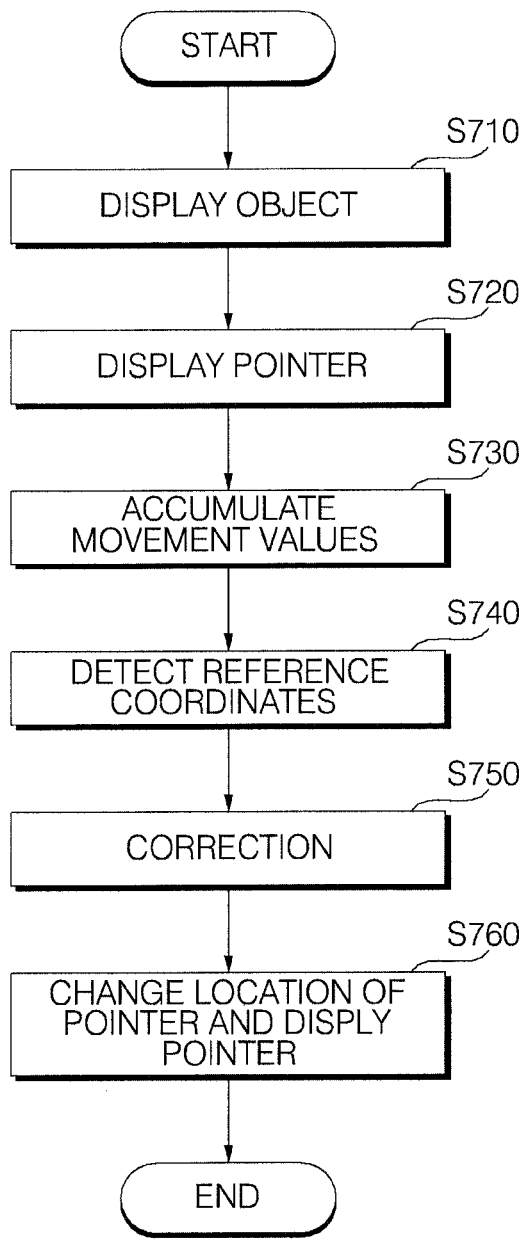
FIG. 7 is a flowchart illustrating a method for operating an image display apparatus according to an embodiment of the present invention.
Figure 8:
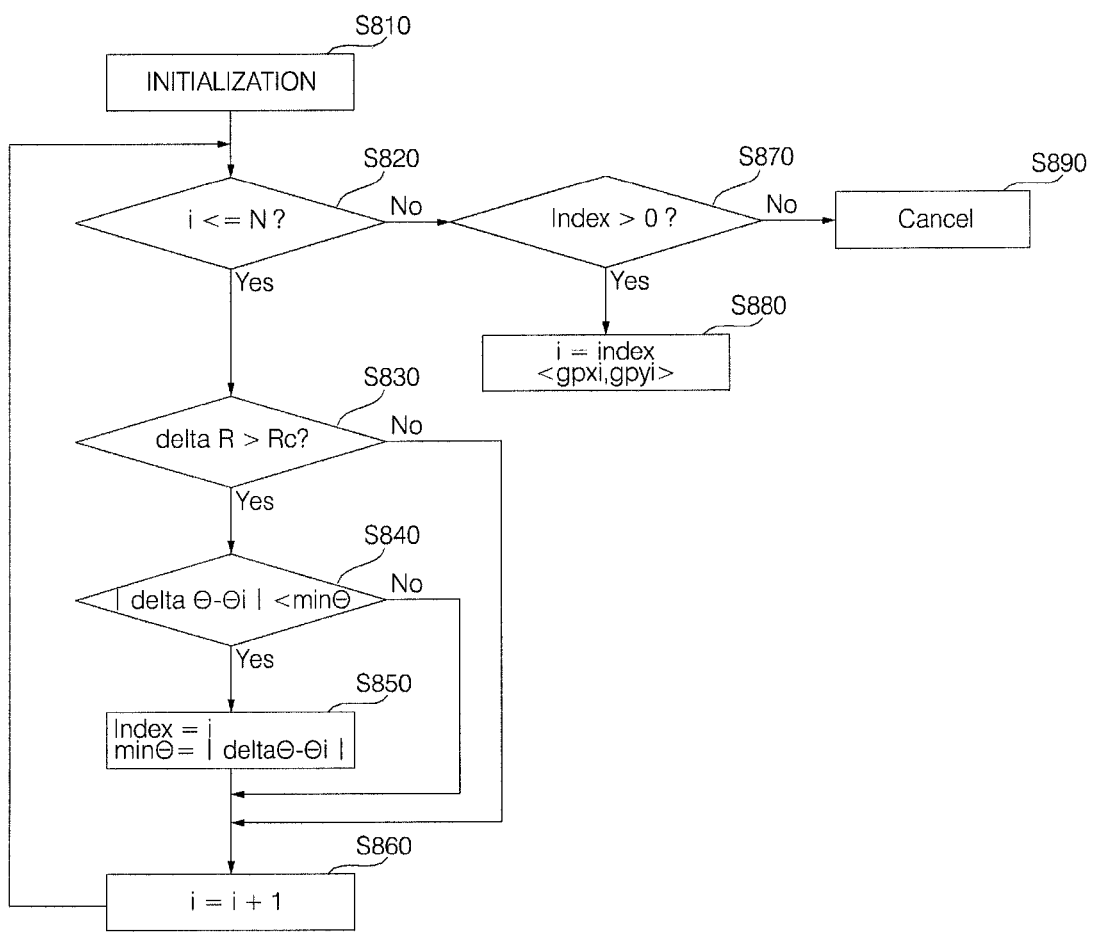
FIGS. 8 to 10 are views referred to for describing various examples of the method for operating the image display apparatus.
Figure 9:
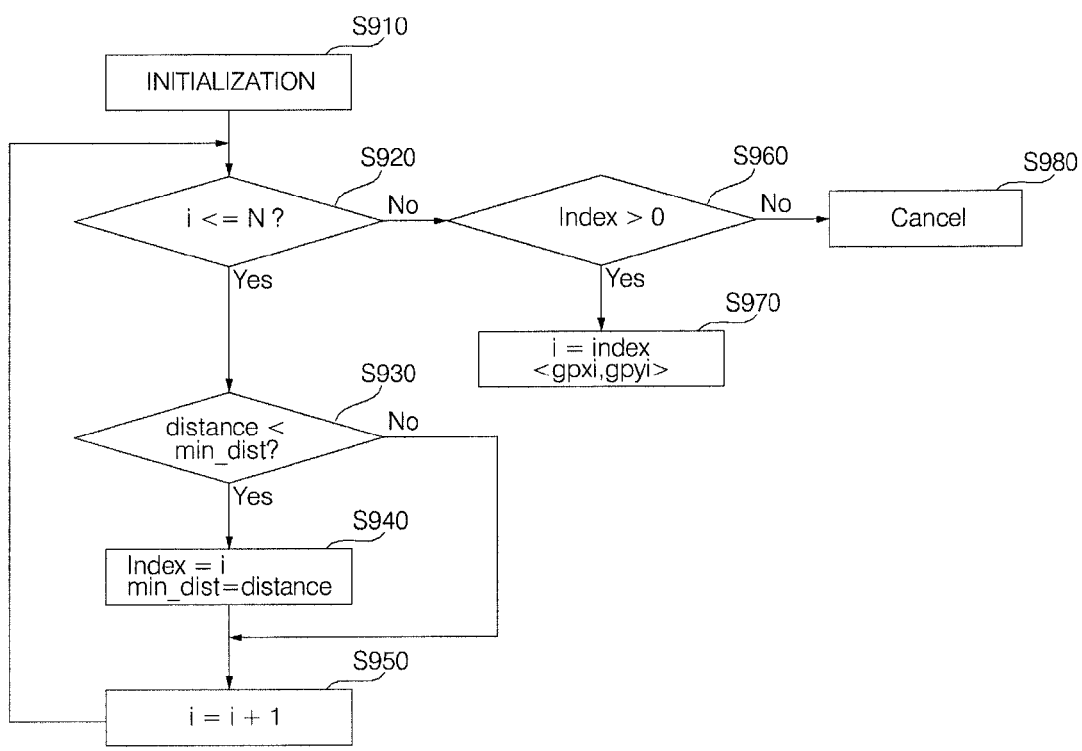
Figure 10:
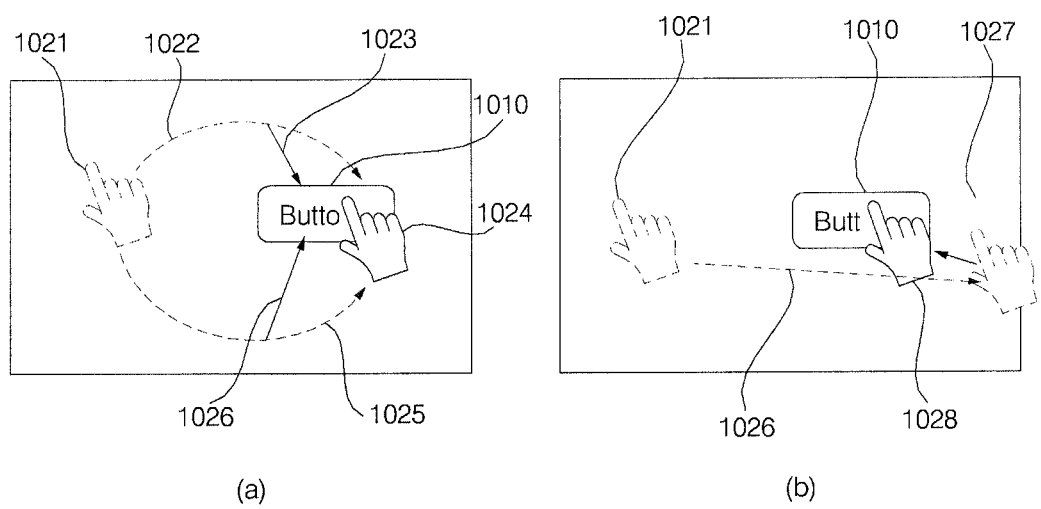

FIG. 7 is a flowchart illustrating a method for operating an image display apparatus according to an embodiment of the present invention, and FIGS. 8 to 10 are views referred to for describing various examples of the method for operating the image display apparatus.

Referring to FIGS. 7 to 10, the image display apparatus 100 according to one embodiment of the present invention may display at least one object on the display 180 (S710) and display a pointer on the display 180 (S720).

The object may include various menus and widgets.

For example, the object may be an on screen display (OSD). Since the image display apparatus stores graphic information, such as sizes or images, of graphic objects such as OSDs, the graphic objects may be readily corrected using graphic information.

The object may be a selectable object. For example, the object may be a selectable menu item. The selectable object may be implemented in the form of a button or a key.

In addition, one OSD may include a plurality of selectable objects. For example, selection items such as "select", "cancel" and "OK" and sub items belonging to a parent item may be included.

The pointer may be displayed in correspondence with motion of a specific key or a specific pattern of the remote controller. For example, if an OK key of the remote controller is pressed or if the remote controller is shaken, the pointer may be displayed.

The pointer may have various shapes. For example, the shapes of the pointer of FIG. 3 and the pointer of FIG. 6 may be different.

A specific object may be displayed earlier than a pointer or a pointer may be displayed earlier than an object.

The controller 170 of the image display apparatus 100 or the coordinate calculator 215 may accumulate movement values of the remote controller during a reference period (S730).

The image display apparatus 100 may receive a signal from the remote controller 200 and calculate coordinates.

Accumulation of the movement values means that all movements of the remote controller during the reference period are applied and includes the movement direction and movement amount of the remote controller during the reference period. Accumulation of the movement values may be expressed in the form of a vector.

Alternatively, accumulation of the movement values may be a value obtained by applying the movement of the remote controller during the reference period to coordinates of a start time of the reference period.

Thereafter, the controller 170 or the coordinate calculator 215 may detect reference coordinates (S740).

The reference coordinates are referred to for correction upon display and movement of the pointer and may be determined according to the kind and attribute of the displayed object. For example, the reference coordinates may be previously generated based on graphic coordinates of the object.

If correction entails moving the pointer toward the object, like the force of gravity for pulling things, the reference coordinates may be referred to as a gravity point and the object may be referred to as a gravity object.

An example of a method of setting the reference coordinates will now be described. First, the reference coordinates (gravity location) may be automatically generated and registered in a memory and/or a buffer when various objects (a controller, a button and a list box) are registered with a software (SW) UI toolkit.

For example, in case of an object having a button shape, assume that the UI toolkit provides an API called int CreatButton (HWND hwnd, int posX, int posY, int nWidth and int nHeight).

Here, HWND hwnd means a window handle, posX and posY mean XY coordinate information, and nWidth and nHeight mean width and height information.

Then, if the central point of a button, a lateral central point and a longitudinal central point are set as the gravity point, coordinates gravity_point <posX+nWidth/2), posY+(nHeight/2)> in a function may be stored in a memory and/or a buffer in the form of a gravity point table along with an index.

Accordingly, since the existing API is reused, it is possible to easily implement a gravity button without correcting the existing code.

The gravity point may be automatically deleted from the table when a corresponding GUI object is hidden or destroyed from a memory. That is, if the object is displayed on the display 180, the object may be temporarily generated, stored and used and then may be automatically deleted, thereby increasing use efficiency of the memory.

If the reference coordinates are detected, the accumulated movement value is corrected based on the reference coordinates (S750), the location of the pointer may be changed based on the corrected value and the pointer may be displayed on the display 180 (S760).

For example, correction may be performed such that the pointer is moved toward the detected reference coordinates and then displayed, by adding and subtracting a predetermined value to and from the accumulated movement value.

Alternatively, the display location of the pointer may be corrected to the detected reference coordinates or may be corrected to be spaced from the detected reference coordinates by a predetermined distance.

If the pointer is displayed spaced apart from the detected reference coordinates by the predetermined distance, the pointer may be displayed spaced apart from the detected reference coordinates in a direction corresponding to the movement direction of the remote controller.

If the reference coordinates are not detected, the location of the pointer may be changed based on the accumulated movement value and the pointer may be displayed. That is, if the reference coordinates are not present or cannot be detected, the pointer may be moved in correspondence with only the movement of the remote controller during the reference period.

In step S740 of detecting the reference coordinates, different detection methods may be performed depending on whether the accumulated movement value is changed.

In step S750 of correcting the accumulated movement value, different correction methods may be performed depending on whether the accumulated movement value is changed.

In step S740 of detecting the reference coordinates, different detection methods may be performed depending on whether movement of the remote controller is finished.

In step S750 of correcting the accumulated movement value, different correction methods may be performed depending on whether movement of the remote controller is finished.

The controller 170 may accumulate the change value of the remote controller such as a pointing device or an OTP during the reference period, that is, GravityCheckInterval, and correct the direction and location of the remote controller.

Accordingly, the location of the pointer may be actually changed at GravityCheckInterval. The interval may be changed and may be set to 50 ms, for example.

If the predetermined reference period has elapsed, it may be determined whether the accumulated movement values deltaXi and deltaY are changed. If the pointer is moved, a gravitational refraction method may be selected and, if the pointer is not moved, a gravitational capture method may be selected.

For example, the gravitational refraction method may detect a maximum-direction gravity point in a closest direction at about 15 degrees from the change direction of the pointer or the remote controller and the gravitational capture method may detect a maximum-proximity gravity point, which is a closest gravity point, among gravity points within about 20 cm from the current location of the pointer.

If the reference coordinates (gravity point) of each method are detected, correction is performed by gravitational refraction and gravitational capture and then the location of the pointer is changed. If the reference coordinates are not detected, the location of the pointer may be changed by the accumulated movement values deltaX and deltaY.

Hereinafter, the gravitational refraction method and the gravitational capture method will be described with reference to FIGS. 8 and 9.

The following equations and factors may be defined in order to describe correction using the gravitational refraction method in detail with reference to FIG. 8.

1. <delta1X, deltaY>: Accumulated change value of the pointer during GravityCheckInterval (or the movement value of the remote controller by the user)
2. <posX, posY>: Current location of the pointer
3. <gpXi, gpYi>: i-th gravity point value in the gravity point table (1<i<N)
4. <relXi, relYi>: Coordinates (relXi=gpXi−posX, relYi=gpYi−posY) obtained by subtracting the current location <posX, posY> from the gravity point <gpXi, gpYi>
5. (Ri, θi): Polar coordinate conversion value (Ri=root (relXi$^2$+relYi$^2$), θi=tan$^{-1}$(relYi/relXi)) of <gpXi, gpYi> when the current location of the pointer is set to a zero point.
6. (deltaR, deltaθ): Polar coordinate conversion value (deltaR=root(deltaX$^2$+deltaY$^2$), deltaθ=tan$^{-1}$(deltaYi/deltaXi)

Hereinafter, the process of detecting the gravity point (maximum-direction gravity point) detected using the gravitational refraction method will be described with respect to FIG. 8.

First, the values of the factors are initialized (S810). For example, i=1, minθ=θc (a specific value, e.g., 15 degrees) and index=0 may be set.

Thereafter, i is compared with N (S820) and the routine is repeated until i becomes greater than N.

If i is less than N, it is checked whether deltaR is less than Rc and whether an absolute value of (deltaθ−θi) is less than minθ (S830 and S840). Rc and minθ are specific constants which may be arbitrarily set in order to change a correction factor.

If the two conditions are satisfied, the value of the index is changed to i and the value of minθ is changed to the absolute value of (deltaθ−θi) (S850) and the i value is increased by one (S860).

If any one of the two conditions is not satisfied, the i value is immediately increased by one (S860).

After the i value is increased, the routine is repeated until i becomes greater than N.

It is checked whether the index is greater than 0 (S870) and, if the index is greater than 0, the i value is set to the index value and <gpXi, gpYi> may be retrieved from the gravity point table as a maximum-direction gravity point (S880).

If the index is less than 0, the gravity point is not detected (S890) and the pointer is displayed without correction.

In the process of FIG. 8, a point having a minimum angle error is detected from gravity points within a specific angle in the gravity point table.

At this time, it is checked whether deltaR is greater than Rc so as to prevent significant gravitational refraction from occurring in a gravity point direction.

If the maximum-direction gravity point is detected, gravitational refraction occurs in inverse proportion to a distance and a correction value is obtained as follows.

$$deltaX'=deltaX+(Alpha/(distance+Beta))*(distX), Beta>Alpha>0$$

$$deltaY'=deltaY+(Alpha/(distance+Beta))*(distY)$$

where, distX and distY respectively denote posX-gpXi and posY-gpYi and the distance may be defined as a distance root((gpXi−posX)$^2$+(gpYi−posY)$^2$) between the gravity point and the location of the mouse. In addition, Alpha and Beta are correction coefficient values and may be set by a manufacturer and a user.

Thereafter, in step S750 of correcting the accumulated movement value, the correction value may be applied to correct the display location of the pointer.

FIG. 10(a) is a diagram referred to for describing change in the location of the pointer corrected by the gravitational refraction method.

If the user wishes to move a pointer 1021 to a button 1010 using the remote controller to select the button 1010, even when the pointer deviates from the button 1010 upward, the pointer may be moved toward the button 1010 downward, thereby correcting (1023) the location of the pointer.

In addition, even when the pointer deviates from the button 1010 downward (1025), the pointer may be moved toward the button 1010 upward, thereby correcting (1026) the location of the pointer.

Accordingly, the pointer 1024 after correction may be closer to the button 1010 as compared to the actual movement of the pointer by the user or may be displayed on the button 1010.

According to the present invention, the location of a selectable OSD (or a GUI) such as a button is stored as a gravity point and, when the movement direction of the pointer is directed to the gravity point or when the pointer is close to the gravity point, the pointer is refracted toward the gravity point, thereby correcting direction errors.

Hereinafter, the process of detecting the gravity point (maximum-proximity gravity point) using the gravitational capture method will be described with reference to FIG. 9.

7. <disX, distY>: distX=posX−gpXi, distY=posY−gpYi
8. Distance: root (distX$^2$+distY$^2$)

First, the values of the factors are initialized (S910). For example, i=1, min_dist=dist_c (specific value, e.g., 10 cm) and index=0 may be set.

Thereafter, i is compared with N (S920) and the routine is repeated until i becomes greater than N.

If i is less than N, it is checked whether a distance is less than min_dist (S930). Min_dist is a specific constant which may be arbitrarily set in order to change a correction range.

If the above condition is satisfied, the value of the index is changed to i and the value of min_dist is changed to the absolute value of the distance (S940) and the i value is increased by one (S950).

If the condition is not satisfied, the i value is immediately increased by one (S950).

After the i value is increased, the routine is repeated until i becomes greater than N.

It is checked whether the index is greater than 0 (S960) and, if the index is greater than 0, the i value is set to the index value and <gpXi, gpYi> may be retrieved from the gravity point table as a maximum-proximity gravity point (S970).

If the index is less than 0, the gravity point is not detected (S980) and the pointer is displayed without correction.

In the process of FIG. 9, a point having a minimum distance from the current location of the pointer is detected from gravity points within a specific distance in the gravity point table.

FIG. 10(b) is a diagram referred to for describing change in the location of the pointer corrected by the gravitational capture method.

If the user wishes to move a pointer 1021 to a button 1010 using the remote controller to select the button 1010, the user may not accurately adjust the movement path 1029 and distance of the remote controller.

However, according to the present invention, a pointer 1027 passing the button 1010 may be moved to the button

1010. Accordingly, the pointer 1028 after correction may be displayed on the button 1010 to which the user desires to move the pointer.

According to the present invention, the location of a selectable OSD (or a GUI) such as a button is stored as a gravity point and, when the movement direction of the pointer is directed toward the gravity point or the location of the pointer is close to the OSD, the direction of the pointer is automatically captured toward the gravity point, thereby correcting strength errors.

If a plurality of objects is displayed, in step S740 of detecting the reference coordinates, reference coordinates closest to the location of the pointer displayed in the step of displaying the pointer among reference coordinates corresponding to the plurality of objects may be determined as the reference coordinates. That is, the reference coordinates may be determined based on the pointer before movement.

Alternatively, in step S740 of detecting the reference coordinates, reference coordinates closest to the location of the pointer, to which the accumulated movement value is applied, may be determined as the reference coordinates. That is, the reference coordinates may be determined based on the pointer after movement.

The remote controller may be the above-described pointing device.

Figure 11:
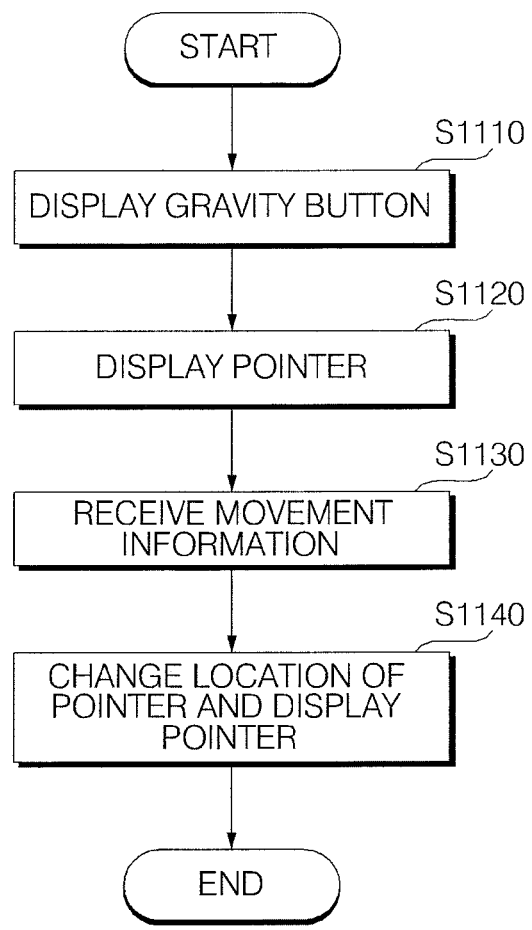
FIG. 11 is a flowchart illustrating a method for operating an image display apparatus according to an embodiment of the present invention.

FIG. 11 is a flowchart illustrating a method for operating an image display apparatus according to an embodiment of the present invention.

The method for operating the image display apparatus may include step S1110 of displaying a gravity button having a gravity point on a display, step S1120 of displaying a pointer on the display, step S1130 of receiving movement information of a remote controller and step S1140 of changing the location of the pointer based on the received movement information and the gravity point and displaying the pointer on the display.

The gravity point may be a longitudinal and lateral central point of the gravity button.

In addition, the gravity point may be previously generated based on the graphic coordinates of the gravity button. For example, a button having int posX, int posY, int nWidth, int nHeight and graphic coordinates may have a central point of posX+(nWidth/2) and posY+(nHeight/2) as the gravity point.

As described above, if a plurality of gravity buttons, a gravity point closest to the location of the pointer displayed in the step of displaying the pointer among the plurality of gravity points may be determined as the reference coordinates or a gravity point closest to the location of the pointer, to which the accumulated movement value is applied, among the plurality of gravity points may be determined as the reference coordinates.

That is, according to embodiments, the gravity point may be determined based on the pointer before or after movement.

In step S1140 of changing the location of the pointer and displaying the pointer, the pointer may be displayed on the gravity point if the movement of the remote controller is finished. That is, if operation of the remote controller is finished and the value obtained by applying operation of the remote controller is within a predetermined distance from the gravity button, the pointer may be moved to and displayed on the gravity point.

According to the present invention, if the image display apparatus is controlled using the remote controller and, more particularly, the pointing device, accuracy and efficiency are improved so as to accurately perform operation desired by the user.

According to the present invention, it is possible to rapidly and accurately locate a pointer at a location desired by a user. Therefore, it is possible to increase user convenience.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display apparatus, the method comprising:
    displaying at least one object on a display;
    displaying a pointer on the display;
    accumulating a movement value including a movement direction and a movement amount of a remote controller during a predetermined period;
    detecting reference coordinates of the displayed at least one object;
    correcting the accumulated movement value based on the reference coordinates if the reference coordinates are detected; and
    changing a location of the pointer based on the corrected value and displaying the pointer, and
    wherein the reference coordinates are a longitudinal and lateral central point of the displayed at least one object, and
    wherein the changing the location of the pointer and displaying the pointer includes displaying the pointer on the reference coordinates, when movement of the remote controller is finished and the accumulated movement value is within a predetermined distance from the displayed at least one object.

2. The method according to claim 1, further comprising changing the location of the pointer and displaying the pointer based on the accumulated movement value if the reference coordinates are not detected.

3. The method according to claim 1, wherein the reference coordinates are previously generated based on graphic coordinates of the object.

4. The method according to claim 1, wherein the reference coordinates are previously generated based on the kind and attribute of the object.

5. The method according to claim 1, wherein the reference coordinates are automatically generated and registered when the object is registered with a user interface (UI) toolkit.

6. The method according to claim 1, wherein the reference coordinates are temporarily generated if the object is displayed and is deleted when the display of the object is finished.

7. The method according to claim 1, wherein:
the displaying the object includes displaying a plurality of objects, and
the detecting the reference coordinates includes determining reference coordinates closest to the location of the pointer displayed in the displaying the pointer among reference coordinates corresponding to the plurality of objects as the reference coordinates.

8. The method according to claim 1, wherein:
the displaying the object includes displaying a plurality of objects, and
the detecting the reference coordinates includes determining reference coordinates closest to the location of the pointer, to which the accumulated movement value is applied, as the reference coordinates.

9. The method according to claim 1, wherein the object is a selectable object.

10. The method according to claim 1, wherein the object is an on screen display (OSD).

11. The method according to claim 1, wherein the remote controller is a pointing device.

12. The method according to claim 1, wherein the detecting the reference coordinates includes performing different detecting methods depending on whether the accumulated movement value is changed.

13. The method according to claim 1, wherein the correcting the accumulated movement value includes performing different correction methods depending on whether the accumulated movement value is changed.

14. The method according to claim 1, wherein the detecting the reference coordinates includes performing different detection methods depending on whether movement of the remote controller is finished.

15. The method according to claim 1, wherein the correcting the accumulated movement value includes performing different correction methods depending on whether movement of the remote controller is finished.

16. A method for operating an image display apparatus, the method comprising:
displaying a gravity button having a gravity point on a display;
displaying a pointer on the display;
receiving movement information including a movement direction and a movement amount of a remote controller; and
changing a location of the pointer based on the received movement information and the gravity point and displaying the pointer on the display,
wherein the gravity point is generated based on graphic coordinates of the gravity button,
wherein the gravity point is a longitudinal and lateral central point of the displayed gravity button, and
wherein the changing the location of the pointer and displaying the pointer includes displaying the pointer on the gravity point, when movement of the remote controller is finished and a value obtained by applying operation of the remote controller is within a predetermined distance from the gravity button from the gravity button.

17. The method according to claim 16, wherein:
the displaying the gravity button includes displaying a plurality of gravity buttons, and
a gravity point closest to the location of the pointer displayed in the displaying the pointer among a plurality of gravity points is determined as the gravity coordinate.

18. The method according to claim 16, wherein:
the displaying the gravity button includes displaying a plurality of gravity buttons or a plurality of objects including the gravity buttons, and
a gravity point closest to the location of the pointer, to which the movement information is applied, among the plurality of gravity points is determined as the gravity point.

* * * * *